Feb. 11, 1936.    P. J. McCULLOUGH    2,030,146
AUTOMATIC CONTROL APPARATUS
Filed Aug. 31, 1931    4 Sheets-Sheet 1
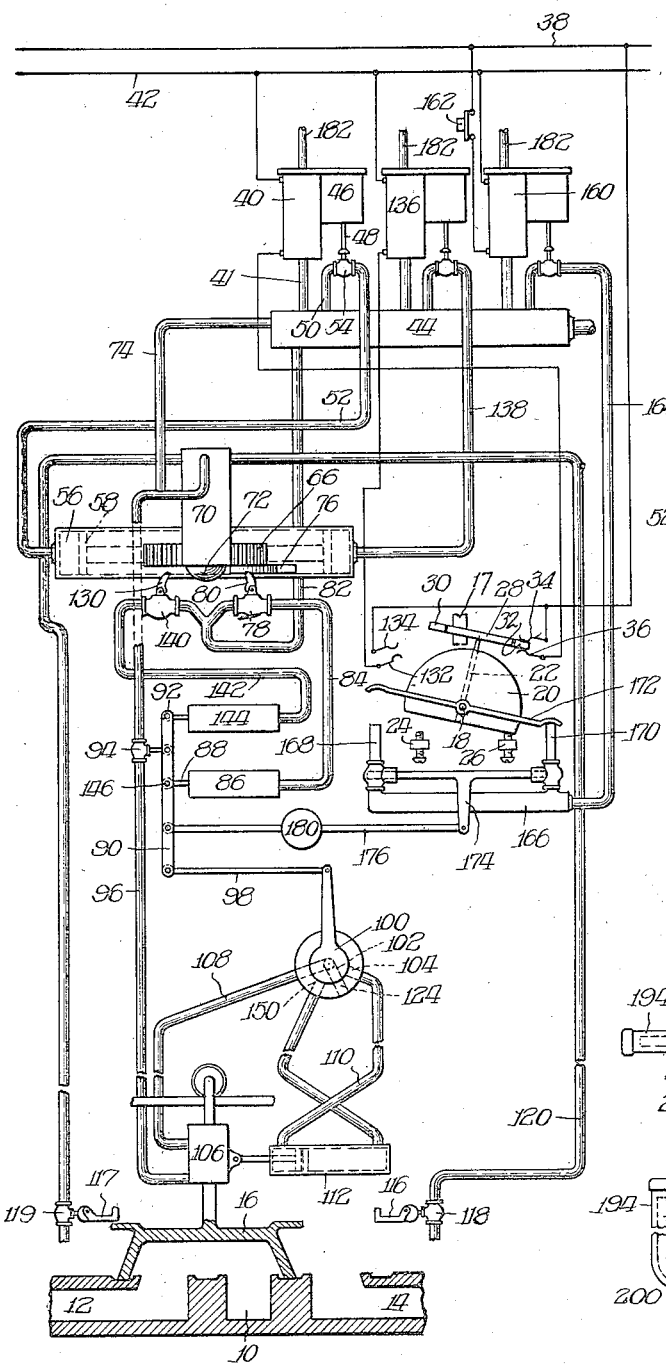
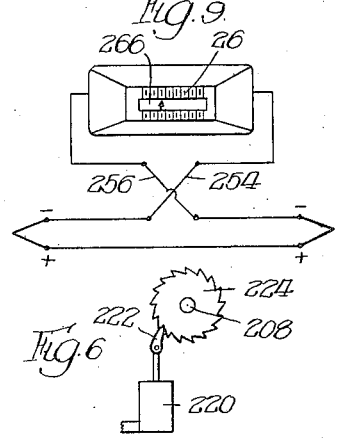
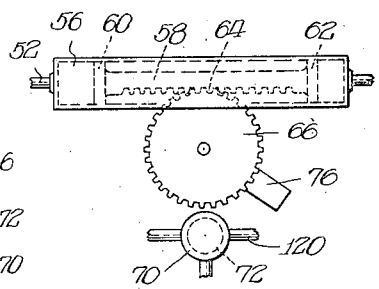
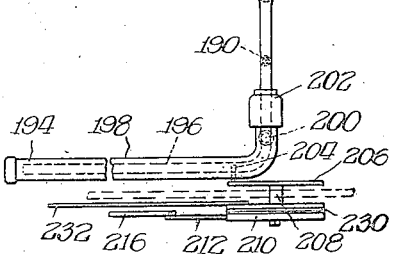
Inventor:
Paul J. McCullough,
By Wilkinson Huxley Byron & Knight
attys.

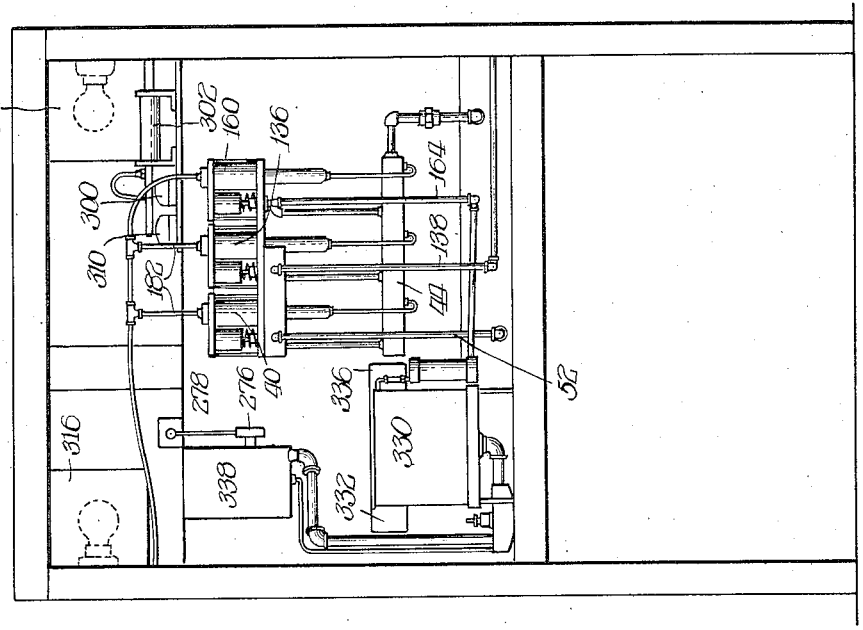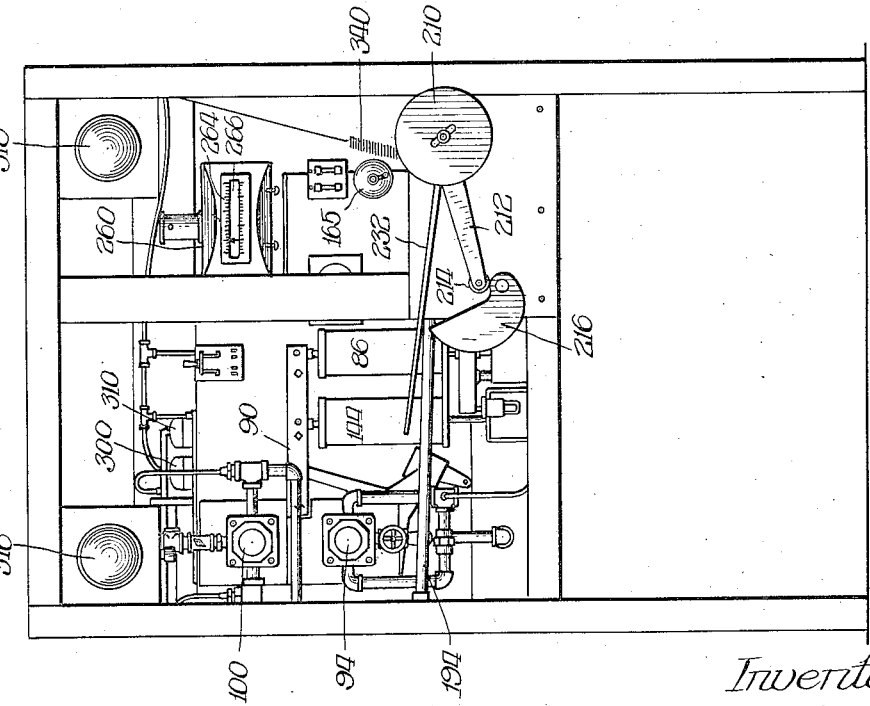

Feb. 11, 1936.                P. J. McCULLOUGH                2,030,146
                          AUTOMATIC CONTROL APPARATUS
                          Filed Aug. 31, 1931      4 Sheets-Sheet 4
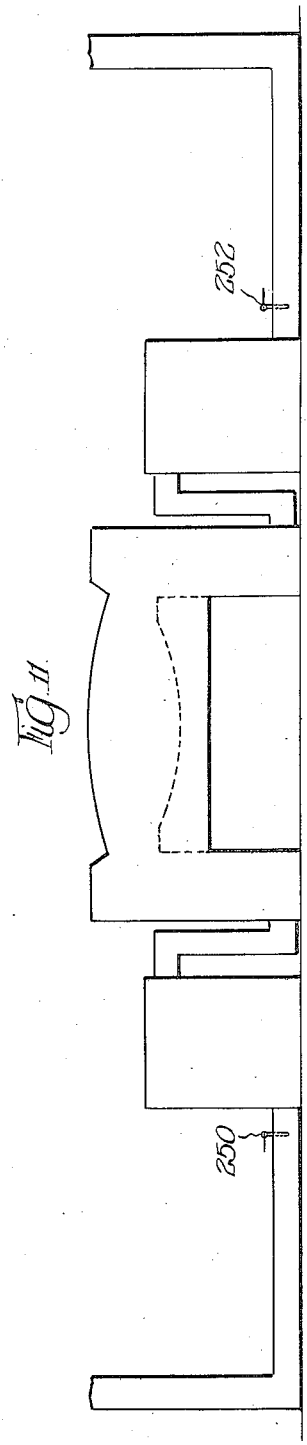
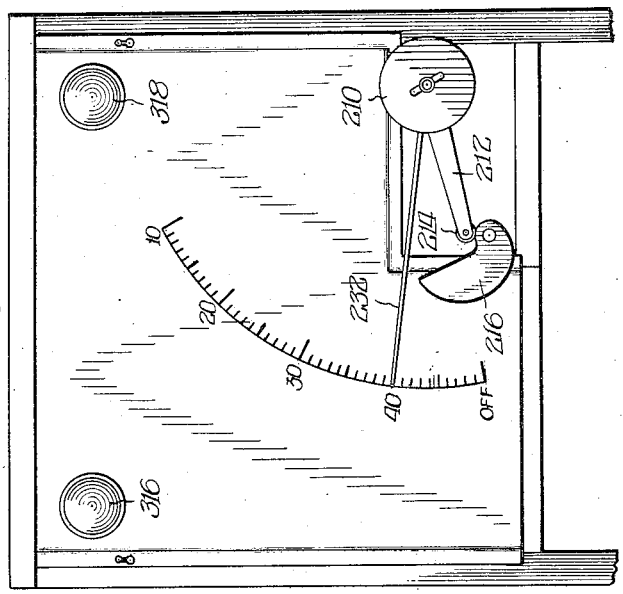
Inventor:
Paul J. McCullough, Patented Feb. 11, 1936

2,030,146

UNITED STATES PATENT OFFICE 2,030,146

AUTOMATIC CONTROL APPARATUS

Paul J. McCullough, St. Louis, Mo., assignor to Scullin Steel Co., St. Louis, Mo., a corporation of Delaware Application August 31, 1931, Serial No. 560,388

10 Claims. (Cl. 236—1)

This invention relates to an improved automatic control and is illustrated herein as embodied in an apparatus for controlling the reversal operations of regenerative furnaces.

A regenerative furnace is one in which a part of the sensible heat of the products of combustion is stored up in chambers made of checker brick, being absorbed by the surfaces of the brick, and is thereafter used in preheating gas or air, or both, going into the furnace. In order to regenerate the heat stored up by the checker brick the flow of the combustible materials, air and gas, and the direction of flame travel are reversed periodically by means of heavy valves. Checker chambers are located at opposite ends of the furnace and in operation, during one period the hot waste gases give up their heat to the checker brick in the chambers at one end of the furnace, while the air entering, or both air and gas, is preheated by passing over the checker brick in the chambers at the opposite end, which was heated on the previous reversal by the waste gases.

Heretofore the reversal operation has generally been controlled manually with little efficiency from the standpoints of fuel consumption and furnace operation and the time consumed in making the reversal manually has been extensive as well as expensive, requiring about 15% of a helper's time.

With the foregoing in view, the present invention has for its object the provision of improved means for automatically controlling the reversal of regenerative furnaces. The invention further contemplates controlling the reversal in a manner that secures maximum efficiency in operation.

There are various ways of controlling the reversal operation, that is, different factors or furnace conditions can be relied upon to govern. For example there is the constant time interval method in which reversals take place so many seconds apart, the period between reversals being uniform. This method would be eminently satisfactory were it not for the fact that the regenerative system increases in temperature each time a reversal takes place and to operate at maximum efficiency the reversals should be accelerated in proportion to the temperature increase. This latter results from a normal increase due to the continued action of the flame which results in any system, and there is a further increase peculiar to regenerative systems because the gases passing through the checker chamber are hotter in every change of direction and produce a more intense flame during combustion. Thus, the action is accumulative and there is a constant increment of temperature increase throughout the entire furnace system.

The so called temperature difference method accommodates the temperature increase by bringing about a reversal each time the temperature on the exhaust side of the regenerative system is a predetermined number of degrees higher than that on the inlet side. In the practice of this method, thermocouples or pyrometers can be placed at similar points in the checker chambers on opposite sides of the furnace and each time the chamber on the exhaust side becomes a certain number of degrees hotter than the one on the inlet side, reversal automatically takes place.

Other methods consist, for instance, in reversing the system each time a predetermined maximum temperature is reached in the exhaust side, or a predetermined minimum in the inlet side. Of the various systems, the present invention is disclosed in connection with the one believed to be the most efficient—temperature difference—although the invention, from many standpoints, is in nowise restricted or limited to this particular system.

Today, in the few instances in which the temperature difference method is being practiced great difficulty arises owing to the inability of pyrometers or thermocouples to withstand the excessively high temperatures to which they must be subjected. The result is that they often break, melt, or wear out thereby rendering the control apparatus inoperative often in the midst of a furnace operation, requiring a shut down or a shift to manual operation, either of which involves loss of efficiency and expense.

With the foregoing in view the present invention contemplates the provision of a control apparatus which, although based on the temperature difference method, is not subject to the faults and objections which are all to prevalent in such apparatus today.

The invention overcomes the main difficulty, mainly that of broken thermocouples, by employing them during only one cycle of operation of the regenerative system, a cycle usually being one heat. The period between reversals is then timed, and from the data thus obtained, a permanent control device, such as a cam, is formed and thereafter it is employed in the control apparatus to accomplish the exact results brought about by the use of the thermocouples. Thus the thermocouples are removed before they have an opportunity to become inoperative through over-heating and the permanent device is substituted, it being simply a cam, a perforated plate, a roll, or such, that cannot easily be rendered inoperative. Furthermore, by preparing a series of these permanent control parts, they can be readily interchanged to vary and to control the reversals as desired.

In another aspect, an important object of the invention resides in a novel method of controlling the regenerative system. Thus, the control is effected initially by temperature differences in the chambers or draft ducts on opposite sides of the furnace and thereafter from a permanent device made from data obtained during the initial step. In other words a temperature difference record in the form of a cam or the like is first made and then employed to control reversals.

Other objects and features of the invention will become apparent from a reading of the following specification in the light of the accompanying drawings, in which, Figure 1 shows, in somewhat diagrammatic form, a regenerative control apparatus;

Figure 3 shows in plan view several parts of the apparatus that are shown in elevational view in Figure 1;

Figure 4 is a detailed view of a device used in conjunction with the apparatus of Figure 1 but not illustrated in the latter;

Figure 5 is a side view of the device of Figure 4;

Figure 6 is a detailed view of a part of the control apparatus;

Figure 7 is a diagrammatic view, in front elevation, of a casing containing the apparatus of Figure 2;

Figure 8 is a rear view of the cabinet shown in Figure 7;

Figure 9 shows a galvanometer used in connection with the temperature difference control apparatus of Figure 2;

Figure 10 is a view of the cabinet of Figure 7 with a protecting shield covering the parts, and Figure 11 shows diagrammatically a regenerative system.

Figure 2:
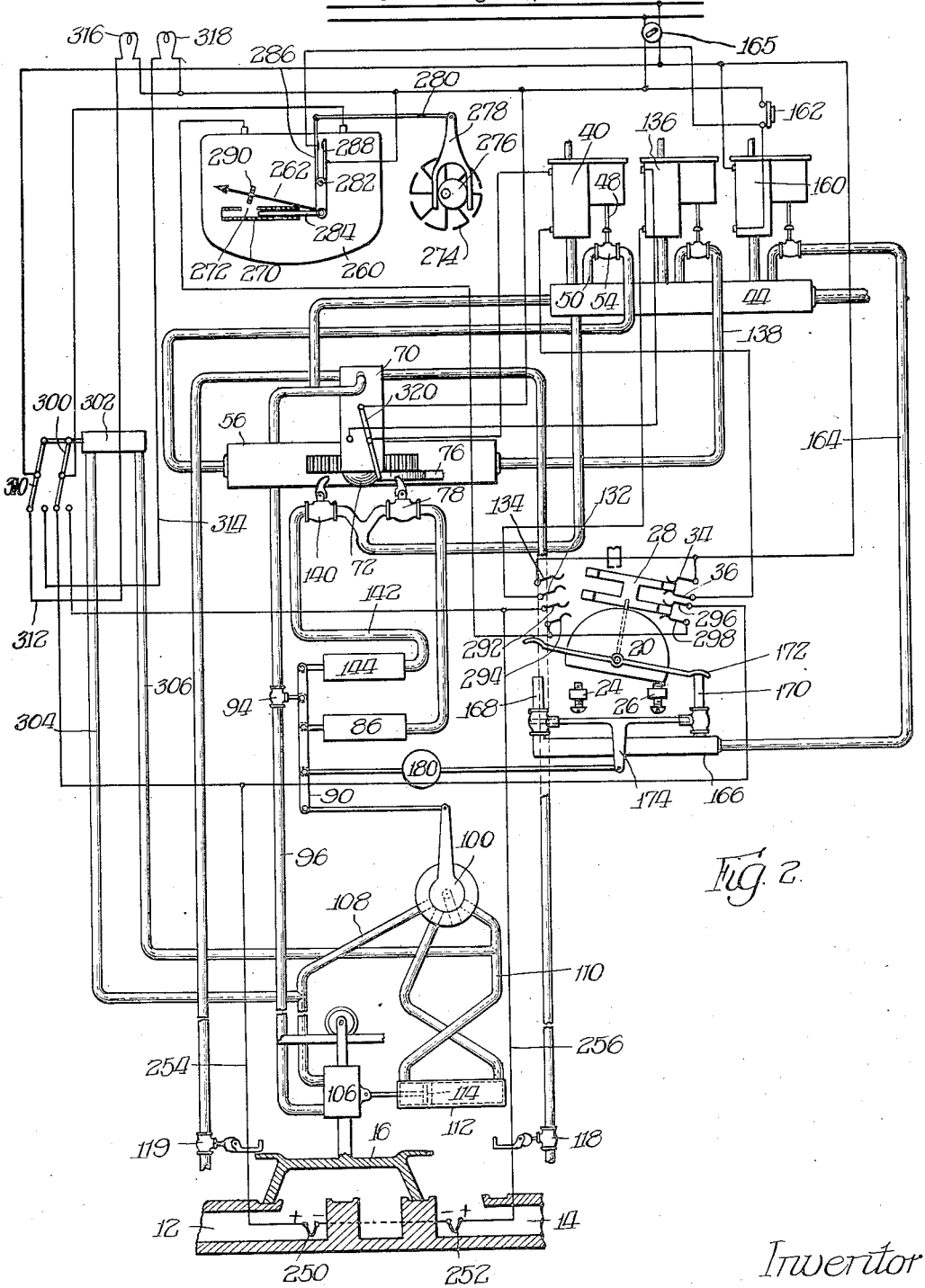
Figure 2 shows a temperature difference control system combined with the apparatus of Figure 1.

As shown in the drawings, reference numeral 10 indicates a passageway leading to the flue or stack of an open hearth furnace, and numerals 12 and 14 denote ducts or draft tunnels leading to opposite ends of the furnace. To those skilled in the art, it will be understood that in the operation of the furnace the hot inert or burned gases pass out of the furnace and down the checker brick in duct 12 and out to the stack through passageway 10. Cold air passes through the checker brick in duct 14 and enters the opposite end of the furnace where it mixes with the incoming fuel. In order to preheat conveniently air going to the furnace, the ducts are provided with a reversing valve 16, the position of which controls the direction of flow of unburned and exhaust gases. While the valve is in the position illustrated, the hot burned gases exhausting through the duct 12 serve to heat the surfaces of the checker brick in such duct. When the desired high temperature is reached, the valve shifts its position to cause cold air to the furnace to pass through the heated duct 12, meanwhile the exhaust gases are passing through duct 14 and heating the checker work therein. By the time duct 12 cools down, duct 14 will have become heated, whereupon another reversal takes place.

As hereinbefore pointed out, this invention pertains to an apparatus for automatically controlling reversal of the furnace to obtain maximum efficiency of furnace operation. By this, it is meant that the reversal operation takes place at a point calculated to extract the utmost pre-heat value from the burned gases and to impart the greatest degree of pre-heating to the incoming unburned gases, meanwhile maintaining the furnace at an approximately uniform high temperature.

Turning now to Figure 1, and the apparatus for automatically controlling the reversal of valve 16, the prime mover for the operation is a small stream of water that flows from an orifice formed in the extremity of a tube 17 located above the axis of pivot 18 of a water box 20. The box is divided, by means of a partition 22 into two compartments of uniform size and is mounted on a knife edge. Stops 24 and 26 are positioned beneath the box and are adjustable for reasons hereinafter to be described.

A switch bar 28 is fixedly secured to the water box and carries at its opposite ends contact members 30 and 32 which are insulated from the rest of the bar. The contact 32 is adapted to engage two terminals 34 and 36, the first of which is in connection with the electric service supply line 38, and the other with a solenoid valve 40 which is in turn connected with the other side of the service supply line 42.

The solenoid valve 40 is of the type disclosed in my copending application, Serial No. 500,764, filed December 8, 1930, and for details of the construction of the valve, attention is invited to said application. Sufficient for the present purposes is the explanation that when the switch, formed by the terminals 34 and 36, is closed, current flows to the valve and energizes a coil within the casing to lift a plunger off of an opening 40 in the top of tube 41 to allow air from a compressed air reservoir 44 to flow through the casing into an adjacent cylinder 46, in which is located a spring-supported piston rod 48. The lower end of the rod is connected to a valve 54 for controlling the passage of air from the reservoir 44 through line 50, 52. The air (fluid pressure) supply line 52 leads to one end of a cylinder 56 having a double acting piston or plunger 58 enclosed therein. As shown in Figure 3, the plunger comprises two heads 60 and 62 joined by means of a rack bar 64 which engages a gear 66.

Pausing for the moment to trace the operation of so much of the apparatus as has already been described, it will be seen that if water enters the box 20 through the inlet 17 in an amount sufficient to throw the box into the position shown in Figure 1, a contact will be made by the member 32, the solenoid valve 40 will be actuated and the piston rod 48 will move downwardly to open the valve 54. When this takes place, air from the reservoir 44 fills the line 50, 52 and flows into the left hand end of the cylinder 56 to push the rack 64 to the right and rotate the gear 66.

The latter gear operates a valve for controlling the line for supplying fuel to the furnace and when the gear has rotated half way, the fuel is cut off to prevent loss while the position of the reversing valve 16 is being changed. In order to hold the gear in its half way position, it being remembered that compressed air is still bearing on the piston 60 carried by the rack bar, there is provided a ball lock valve 70. This valve comprises a casing having a heavy ball 72 entrapped in its base. Normally compressed air from the reservoir 44, flowing through line 74 enters the upper portion of the casing and exerts its pressure on the exposed area of the ball, thereby holding it firmly on its seat. Co-operating with the ball lock 70 is a lever or arm 76 secured to and projecting from the lower side of the gear 66. Thus, that gear rotates until the arm 76 strikes the ball 72, whereupon it is held against further rotation and the flow of fuel is cut off.

Also located in the path of movement of the arm 76, in advance of the ball lock 70, is a valve 78, the opening and closing of which is controlled by the arm. In operation, viewing Figure 1, the arm moving with the gear 66 strikes a pivoted cam 80 carried by the valve 78. The cam is depressed to open the valve and is held in that position by the over-riding arm striking the ball lock 70. The opening of valve 78 allows air to flow from line 82 into line 84 and then enter cylinder 86. Within the latter there is located a spring-sustained piston, which succumbs to the pressure of the air and, by means of a piston rod 88, swings a lever 90 about the fulcrum 92. In swinging, the lever performs two operations: First, it opens valve 94 to allow air from the reservoir to spill into line 96; and, second, it shifts, through connection 98, the three way valve 100, moving the port 102 into registry with port 104.

The reversing valve 16 is lifted, prior to being shifted, by means of the air flowing through line 96 into cylinder 106. Located within the latter is a piston which reacts to the air pressure to lift the valve. When the piston is lifted to the top of chamber 106, the air by-passes through line 108 and enters the three way valve 100. It then flows through the ports 102 and 104 into line 110 and enters cylinder 112 where it acts on piston 114. The latter moves to the right, as viewed in Figure 1, and pulls with it the lifted valve 16.

In moving, the valve 16 strikes a pivoted pawl 116 which controls a valve 118 placed in an air exhaust line 120. When the valve 118 is opened, air from the chamber of the ball lock is exhausted unlocking the lever or arm 76. The latter releases the valve 78 cutting off the supply of air to cylinder 86, whereupon the spring-pressed piston within the cylinder is restored to its normal position and the three way valve 100 moves into a position in which the port 102 is in registry with an exhaust port 124. Thus, air entrapped in lines 96 and 98 and in chamber 106 and cylinder 112 is exhausted. Furthermore, when the valve 94 is closed, entrapped air in the lines 96 and 106 can escape around the stem of the valve.

Air continues to flow into cylinder 56, thereby causing the gear 66 to rotate further to again turn on the supply of fuel. During this rotation, the lever 76 passes harmlessly over the pivoted pawl or detent 130 and at the same time reverses a switch 320 (Fig. 2), hereinafter to be described. This marks the completion of one reversal operation.

Counterparts of the aforedescribed apparatus are provided for effecting movement of the valve 16 in the opposite direction. Thus, water flowing from pipe 16 into the box 20 fills the empty compartment and throws the box to the left. Contact is thereby established between members 132 and 134, causing energization of solenoid valve 136. The shifting of the box broke the contact between 34 and 36, whereupon the solenoid valve 40 closed, shutting off the supply of air to line 52 and the air already in that line exhausted through the stem of the valve 54. Operation of the second solenoid valve 136 admits air to line 138 and to the opposite end of cylinder 56, shifting the rack 58 to rotate the gear 66 in the reverse direction. Lever 76 depresses pawl 130 of valve 140 and strikes the ball lock 70. Air flows past valve 140 into line 142 and enters cylinder 144. The lever 90 then swings about fulcrum 146 bringing port 102 of the three way valve into registry with port 150. Air enters chamber 106 to lift the reversing valve 16 and then by-passes through the three way valve to the opposite end of cylinder 112 to move the valve back to the position illustrated. In rising, projections 152 and 154 formed on the valve 16 ride harmlessly on the pivoted pawls 116, 117 of the exhaust valves 118, 119, but when the valve moves right or left, they strike the pawls to open the valves and exhaust air from the ball lock 70.

The apparatus is also equipped with means for manual operation and, to this end, there is provided a third solenoid valve 160, the energization of which is controlled by a push button 162. In operation, when the button is pressed, air from the reservoir 44 flows through line 164 and enters a compartment 166 having a pair of tubes 168 and 170 extending upwardly therefrom. An elongated member 172 having cup-shaped extremities is carried by the water box 20 in such a manner that one of the cups rests on top of one of the tubes 168, 170, depending upon the direction in which the box is tilted. A slide valve 174 connected with the lever 90 by means of a rod 176 is arranged to shut off one or the other of the tubes 168, 170, depending upon its adjustment. As illustrated, air from the reservoir entering the compartment 166 will flow through the pipe 170, the position of the valve 174 preventing the flow of air through the pipe 168, and, engaging the cup-shaped extremity of the member 172 carried by the water box 20, will throw the box into its opposite position just as would an accumulation of water within the box. Of course, the results which thereafter ensue are the same as those which take place when the water box has been thrown by a steam of water entering the box from the pipe 16.

To assure that the valve 174 will be so shifted during each operation that the tubes 168, 170 engaged by the cup-shaped extremity of the member 172, will be open, there is interposed between the valve and the lever 90, a casing 180 having a link bar system within it. The link bar system is so arranged that it will cause the valve to be shifted each time the lever 90 swings about its point of pivot to either side of its normal position of rest shown in Figure 1. Before passing, it should be mentioned that the three solenoid valves 40, 136, and 160 exhaust through tubes 182 leading from the top of the valves.

From the description so far given, it will be understood that reversal of the furnace takes place each time the water box 20 shifts its position, and that movement of the latter is controlled by the volume of water flowing from the pipe 17. If the flow is increased, the reversal operations will accelerate accordingly, and this is important inasmuch as the period between reversals should be constantly decreased as the furnace becomes hotter and hotter. The apparatus is equipped with means for governing, in a predetermined way, the amount of water flowing into the water box 20, and to this end, as shown in Figures 4, 5, and 7, the water enters through a column which is adjustable to provide a varying head, the height of which controls the rate of flow. As there illustrated, the water enters through an inlet 190 and can flow in either of two directions, viz., toward the outlet pipe 17 which has an orifice 192 therein, or into the adjustable column 194. The latter comprises an open-ended tube 196 connected with the inlet and enclosed within a hollow shell 198 having a drain 200. Both the tube and shell are pivoted at the point 202 in order that they may be raised from a normal horizontal position into a tilted or even vertical position. When disposed horizontally, the flow of water to the box 20 will be very slow, but it will increase as the column 194 rises, and the apparatus is provided with means for raising the column in a desired, predetermined manner.

As shown in Figure 4, a pin 204 engages the under side of the column and is carried by a disk 206 on a hub 208. Pinned to the outer end of the hub is a disk 210 (Fig. 7) carrying an arm 212 having a follower roll 214 mounted in its outer extremity. A cam 216 is positioned to be engaged by the follower 214 and rotation of the cam raises the arm 212 and consequently the water column 194. Accordingly, it will be understood that the shape of the cam 216 controls the movement of the arm, the amount of water entering the box 20, the rapidity of movement of the latter, and finally the reversal of the furnace valve 16.

In order to rotate the cam, the apparatus is provided, as shown in Figure 6, with an air-operated cylinder 220 carrying a ratchet 222 for engaging a ratchet wheel 224 carried by the hub 208, or, if desired, the disk 206 can be converted into a ratchet wheel by cutting teeth in its periphery. The air cylinder 220 is connected with line 96, below the valve 94 so that on each reversal operation, a partial rotation of the ratchet wheel and the cam 216 takes place. It should be understood that the cam would normally decrease the period between reversals until the highest point of the cam is reached, at which time the cam could be stopped or the control removed therefrom during the continued operation of the furnace at its full temperature.

To indicate visibly the period of time between reversals, the disk 210 which is rotated by the cam 216 has clutched to it, by means of leather disks 230, a pointer 232, Figure 10, arranged to ride over a graduated time scale 234, thus indicating at all times the number of seconds interval between reversals. In the event that it should be desirable to speed up the reversal operation on one end only of the furnace, the stops 24 and 26 beneath the water box can be adjusted separately to accomplish this end. Thus, by raising the stop 26, less water will be required to tilt the box to the left and reversal will take place that much sooner. Also, by raising or lowering both stops, the reversals will be accelerated or decelerated as desired.

It has been pointed out that the cam 216 is relied upon to govern the reversals and attention will now be devoted to a discussion and a description of the way in which the cam is produced. Since all furnaces have their own peculiarities and no two can be controlled exactly alike to obtain maximum efficiency, it is necessary to plot a separate cam for each furnace, and to plot new ones from time to time as the furnace becomes worn or clogged or other conditions change. Of various methods of determining when regenerative furnaces should be reversed, that predicated on the difference in temperature between opposite ends of the checker chambers is, to the inventor's mind, preferable. Accordingly, he has employed this method in obtaining data for plotting the cam, but it will be appreciated that other methods, such as the constant time interval reversal, may be employed without departing from the invention in many of its respects.

The temperature difference method of control consists in placing thermocouples in corresponding locations in the regenerative system, either in the flues or checker chambers, one on each end of the furnace. When a reversal operation takes place, the thermocouple which had been heating begins to cool at once, while the thermocouple which was cooling begins to heat. This changes the E. M. F. generated by each couple and, by placing in the circuit a meter or measuring device which reacts to the change, the indicator of the instrument will be caused to move more and more as the temperature difference increases. By setting the instrument to a desired temperature difference, the result will be that whenever one of the flues or checker chambers is a predetermined number of degrees hotter than the other, a reversal will take place.

It has already been pointed out that the reversal operation must be accelerated during operation of the furnace and the reason for so doing will now be briefly described. On every reversal, the temperature of the furnace is increased, for there is a normal increase due to the continued action of the flame which results in any system, and there is a further increase peculiar to regenerative systems because the gases passing through the checker chamber are hotter in every change of direction and produce a more intense flame temperature during combustion. Thus, the action is accumulative and there is a constant increment of temperature increase throughout the entire furnace system. This factor results in the predetermined difference in temperature between opposite checker chambers being attained more quickly upon each reversal of the system.

In Figure 2, the apparatus of Figure 1 is shown in combination with means for operating the furnace according to the temperature difference method. In accordance with the practice of the invention, the temperature difference method is relied upon to obtain the data for plotting and making the cam 216 and thereafter the latter is utilized for controlling subsequent furnace operations. In view of the fact thermocouples cannot satisfactorily withstand but for a short while the intense temperatures in the checker chambers, it is a highly important feature of the invention which contemplates the utilization of this method in the preparation of the cam and thereafter controls operations by the cam itself. Thus, as soon as the cam has been made, the thermocouples may be removed and the cam relied upon entirely for controlling the furnace reversals.

In view of the fact that a great part of the apparatus in Figure 2 is identical with that shown in Figure 1, the same reference numerals have been used to indicate identical parts and the description to follow will be mainly restricted to a discussion of the temperature difference control system, which is not shown in Figure 1. As shown in Figure 2, thermocouples 250 and 252 are located in the ducts 12 and 14 near or within the checker chambers. Assuming that reversing valve 16 (often termed the "turtle back" valve) has just changed over to the position illustrated, and that couple 250 begins to increase in temperature and couple 252 begins to decrease, an electromotive force will be set up and through conductors 254 and 256 will be transmitted to an instrument 260 such, for example, as a milli-ammeter or milli-voltmeter for measuring the amplitude of the force. The measurement is effected by a pointer 262 which is caused to swing by the force and registers the degree of swing upon a scale 264 formed adjacent to a window 266 in the front of the instrument 260, these latter features being more clearly illustrated in Figures 7 and 9.

Also located within the instrument 260 and carried by the casing of the instrument is a hollow tube 270 having a notch 272 cut therein. Under normal conditions, a water wheel 274 located in the rear of the instrument rotates at a constant speed and, by means of an eccentric 276, rocks a yoke 278 back and forth. Movement of the yoke is, by means of the connection 280, imparted to an upstanding switch member which is pivoted at 282 and connected at its lower extremity to a rod 284 riding in the hollow tube 270. The switch is composed of a pair of contact members 286, 288 of a flexible material, which normally remain out of contact with one another, but are, if the sliding movement of the rod 284 in the hollow tube is impeded, adapted to move into engagement with one another to close a circuit.

It will be obvious from an inspection of the instrument 260, as shown in Figure 2 that when the E. M. F. in the thermocouple circuit becomes great enough, the arrow 262 will swing into a position in which a projection 290 carried by the arrow enters the notch 272, thereby holding the rod 284 against movement and moving the contact members 286 and 288 into engagement with one another. When this is done, it has exactly the same effect as manually closing the switch button 162, which is shown in Figure 1. In other words, it energizes the third solenoid valve 160 permitting air from the reservoir 44 to flow through line 164 and into the compartment 166, from which extend the upright tubes 168, 170, thereby causing the water box 20 to trip or shift its position, with the result that the reversal operation takes place just as described in connection with Figure 1, and thereafter, the electromotive force being reversed, as will be described, the pointer 262 moves out of the notch 272, the contact members 286 and 288 separate and the apparatus is conditioned for another reversing operation when again the predetermined temperature difference is reached.

In the apparatus disclosed in Figure 2, the switch 28 carried by the water box 20 is a four-way switch, the two additional contact members being provided for the purpose of reversing the direction of flow of current from the thermocouples 250 and 252, to the instrument 260 each time that the reversing valve 16 is shifted. The reason for doing this is obvious. Instruments of this kind have two terminals, one positive and one negative, and in order to operate properly, the flow of electricity into the instrument must always be through the positive terminal and out the negative one. Inasmuch, however, as heat causes the current to flow, the direction of flow from the thermocouples changes every time the regenerative system is reversed and the circuit must accordingly be built to reverse the instrument 260 each time the valve 16 is reversed. It is for this reason that contact members 292 and 294, 296 and 298, have been provided and are adapted, through co-operation with the switch 28 and a two-way reversing switch 300, to change the polarity upon each reversal. The two-way switch 300 is actuated by a double acting plunger located within a cylinder 302, which plunger is controlled by air admitted to one or the other end of the cylinder through lines 304 and 306 coming from lines 108 and 110. The plunger within the cylinder 302 also actuates a second three-way switch 310 which, through conductors 312 and 314, is connected with signal lamps 316 and 318. These lamps located in opposite upper corners of the container for the apparatus (see Figures 7, 8, and 10) enable the operators of the furnace to see at a glance which side of the regenerative system is cooling and which is heating.

In Figure 2, the third solenoid valve 160 has illustrated in connection therewith a switch 165, the purpose of which is to throw the apparatus completely out of or into operation. In other words, it is the main control switch. The contact members 132 and 36 are connected with the first and second solenoid valves 40 and 136 in the same manner illustrated in connection with Figure 1. The two co-operating contact members, namely 34 and 134, do not lead directly to the main service lines, but are connected thereto through an intermediate two-way switch 320, movement of which is controlled by the lever 76 engaging with the switch and moving it into a position to energize the solenoid valves alternatively.

From the description which has been given, it will be understood that the apparatus shown in Figure 2 includes means to operate the reversing valve 16 by (a) the temperature difference method; (b) the cam 216 plotted from data obtained from the temperature difference method; (c) manually by depressing a switch button; and (d) the constant time interval method by using the apparatus of Figure 1, without either the cam or the thermocouples. Furthermore, the three methods have been so combined as to utilize as many common parts as possible.

It will be understood that at the commencement the temperature difference method is relied upon entirely to control reversal operation and does so by imparting movement to arrow 262 to move the latter into the notch 272 to close the circuit and effect reversal of the valve 16 when the predetermined temperature difference has been reached. Of course, conditions may vary so that it might be desirable to increase or decrease the number of degrees difference in temperature between reversals and, in order to accommodate this simply and efficiently, the invention contemplates securing the hollow tube 270 to the casing of the instrument 260 and to mount the casing for rotation relatively to the indicator or arrow 262. By this arrangement, the casing may be rotated to move the hollow tube 270 and its notch 272 further away from or closer to the movable indicator 262 to increase or decrease the movement which the indicator must make in order to enter the notch. Since the movement of the indicator is directly dependent upon the amount of current and the temperature difference of the thermocouples 250 and 252, it will be at once seen that by varying the distance between the indicator and the notch, the temperature difference may be increased or decreased as desired.

By timing the interval between reversal operations which take place according to the temperature difference method, data is obtained which will enable the cam 216 to be plotted and formed. Thereafter the thermocouples which cannot withstand the high temperatures can be withdrawn and the cam utilized to control subsequent operations. A series of cams can be made for a furnace in order that any desired control may be effected.

Referring for a moment to the drawings, Figures 1 and 2 disclose the apparatus diagrammatically and without reference to relative dimension of parts. For instance, the reversing valve 16, called "the turtle back" generally weighs about 1,700 pounds and is approximately as large as the cabinet occupied by the entire mechanism for controlling its reversal. In Figures 7, 8 and 10, the cabinet is shown as it may be actually constructed and in these figures the same reference characters have been employed to indicate parts identical with those shown in Figures 1 and 2. The figures are included merely to show diagrammatically the manner in which the parts can conveniently be positioned within a small cabinet.

In Figure 8, the casing 330 contains the water box 20; the smaller casings 332 and 336 enclose the switch members for the double acting switch 28 which is carried by the water box, and the casing 338 has within it the water wheel 274 for controlling movement of the rod 284 within the hollow tube 270. In Figure 7, there is shown a spring 340 which may be employed to assist in raising the water column 194.

Figure 11 shows one form of regenerative system in which a centrally located furnace has ducts leading to checker chambers and then on to exhaust outlets. As therein shown the thermocouples are placed within the exhaust ducts beyond the checker chambers, but they may, of course, be placed at other convenient locations.

Although the control apparatus is illustrated in conjunction with a regenerative system it will be appreciated that the apparatus might be employed in connection with different kinds of systems requiring automatic control without departing from the scope of the invention as outlined in the appended claims. Furthermore, that various changes, modifications, substitutions, and rearrangements may be made in the illustrated form of the invention without escaping from the limits and bounds of the invention.

Having thus described the invention, what I claim as new and desire to secure by Letters Patent of the United States is:

1. The method of controlling regenerative furnaces having regenerative chambers and valve mechanism for controlling the flow of combustion materials, which comprises producing a stream of fluid, the magnitude of which varies approximately in proportion to the average temperature in said chambers, and effecting reversal of the valve mechanism periodically, whenever a given volume of fluid has flowed since the last reversal.

2. The method of controlling through a plurality of separate cycles of operation regenerative furnaces having regenerative chambers and valve mechanism for controlling the flow of combustion materials, which comprises initially effecting actuation of said valve mechanism in direct response to variation of temperature of a predetermined value in said chambers, producing a stream of fluid, the magnitude of which varies in accordance with the initial rate of recurrence of variations of temperature, and in a subsequent cycle effecting actuation of the valve mechanism periodically, whenever a given volume of fluid has flowed since the last reversal.

3. The method of controlling through a plurality of separate cycles of operation regenerative furnaces having regenerative chambers and valve mechanism for controlling the flow of combustion materials, which comprises initially producing an electric current, the magnitude of which varies with the temperature in said chambers, controlling said valve mechanism by said current upon attainment of a magnitude corresponding with a predetermined temperature difference between said chambers, producing a stream of fluid, the magnitude of which varies in accordance with the initial rate of recurrence of variations of temperature, and in a subsequent cycle effecting actuation of the valve mechanism periodically, whenever a given volume of fluid has flowed since the last reversal.

4. A regenerative system having, in combination, regenerative chambers, valve mechanism for controlling the flow of combustion materials through said chambers, and apparatus for effecting actuation of said valve mechanism, said apparatus comprising means effective when desired for actuating said valve mechanism in response to temperature differences in heated regions of the system and means alternatively effective when desired for actuating said valve mechanism at varying intervals independently of the temperature differences in such heated regions of the furnace but in a definite relation to temperature differences during a past cycle of operation.

5. A regenerative system having, in combination, regenerative chambers, valve mechanism for controlling the flow of combustion materials through said chambers, and apparatus for effecting actuation of said valve mechanism, said apparatus comprising means effective when desired for actuating said valve mechanism in response to predetermined changes in temperature within the system and means alternatively effective when desired for actuating said valve mechanism, automatically and at varying intervals, independently of such changes in temperature but in a definite relation to temperature differences during a past cycle of operation.

6. A regenerative system having, in combination, regenerative chambers, valve mechanism for controlling the flow of combustion materials through said chambers, and apparatus for effecting actuation of said valve mechanism, said apparatus comprising means effective when desired for actuating said valve mechanism in response to predetermined changes in temperature within the system and means alternatively effective when desired for actuating said valve mechanism, automatically, independently of such changes in temperature, said latter named means including a fluid-operated control device movable between a plurality of positions to actuate, depending on its position, one or the other of a plurality of devices for controlling the admission of fluid under pressure to a cylinder for shifting the position of the valve of said mechanism.

7. A regenerative system having, in combination, regenerative chambers, valve mechanism for controlling the flow of combustion materials through said chambers, and apparatus for effecting actuation of said valve mechanism, said apparatus comprising means effective when desired for actuating said valve mechanism in response to predetermined changes in temperature within the system and means alternatively effective when desired for actuating said valve mechanism, automatically, independently of such changes in temperature, said latter named means including a fluid-operated control device, means for varying in a predetermined manner the amount of fluid supplied to said device, and means for changing the setting of said control device to govern in a desired manner the rapidity of operation thereof.

8. A regenerative system having, in combination, regenerative chambers, valve mechanism for controlling the flow of combustion materials through said chambers, and apparatus for effecting actuation of said valve mechanism, said apparatus comprising means effective when desired for actuating said valve mechanism in response to predetermined changes in temperature within the system and means alternatively effective when desired for actuating said valve mechanism, automatically, independently of such changes in temperature, said latter named means including a fluid-operated control device movable between a plurality of positions, means responsive to movement of said control device into any one of said plurality of positions to effect reversal of the regenerative system, and means for varying and controlling the frequency of movement of said device from one position to another.

9. A regenerative system having, in combination, regenerative chambers, valve mechanism for controlling the flow of combustion materials through said chambers, and apparatus for effecting actuation of said valve mechanism, said apparatus comprising means effective when desired for actuating said valve mechanism in response to predetermined changes in temperature within the system and means alternatively effective when desired for actuating said valve mechanism, automatically, independently of such changes in temperature, said latter named means including a cam, a pivoted water box, means controlled by the cam for regulating the flow of water into the box, an air-controlled apparatus for actuating the valve, and means operated by the pivotal movement of the water box for effecting operation of the air-controlled apparatus.

10. A regenerative system having, in combination, regenerative chambers, valve mechanism for controlling the flow of combustion materials through said chambers, and apparatus for effecting actuation of said valve mechanism, said apparatus comprising means effective when desired for actuating said valve mechanism in response to predetermined changes in temperature within the system and means alternatively effective when desired for actuating said valve mechanism, automatically, independently of such changes in temperature, said latter named means including a cam, a pivoted water box, means controlled by the cam for regulating the flow of water into the box, an air-controlled apparatus for actuating the valve, means operated by the pivotal movement of the water box for effecting operation of the air-controlled apparatus, and means for adjusting the position of the box to control the frequency of operation of the air-controlled apparatus.

PAUL J. McCULLOUGH.